United States Patent
Pavan et al.

(10) Patent No.: US 11,876,401 B2
(45) Date of Patent: Jan. 16, 2024

(54) UNINTERRUPTIBLE POWER SUPPLY SYSTEM WITH DYNAMIC BYPASS-POWER SHARING

(71) Applicant: SOCOMEC, Benfeld (FR)

(72) Inventors: Federico Pietro Pavan, Costabissara (IT); Michele Vivian, Sovizzo (IT)

(73) Assignee: SOCOMEC, Benfeld (FR)

( * ) Notice: Subject to any disclaimer, the term of this patent is extended or adjusted under 35 U.S.C. 154(b) by 216 days.

(21) Appl. No.: 17/627,945

(22) PCT Filed: Jul. 9, 2020

(86) PCT No.: PCT/FR2020/051246
§ 371 (c)(1),
(2) Date: Jan. 18, 2022

(87) PCT Pub. No.: WO2021/014069
PCT Pub. Date: Jan. 28, 2021

(65) Prior Publication Data
US 2022/0294259 A1    Sep. 15, 2022

(30) Foreign Application Priority Data
Jul. 19, 2019 (FR) .................................... 1908246

(51) Int. Cl.
*H02J 9/06* (2006.01)
*H02J 3/01* (2006.01)

(52) U.S. Cl.
CPC ................ *H02J 9/062* (2013.01); *H02J 3/01* (2013.01)

(58) Field of Classification Search
CPC ...... H02J 9/062; H02J 3/01; H02J 3/46; H02J 7/0016; H02J 7/02; H02J 7/34
See application file for complete search history.

(56) References Cited

U.S. PATENT DOCUMENTS

| 2003/0048006 A1* | 3/2003 | Shelter, Jr. | H02J 9/061 307/64 |
| 2013/0193761 A1* | 8/2013 | Colombi | H02J 9/062 307/64 |

(Continued)

OTHER PUBLICATIONS

Search Report from corresponding French Application No. FR1908246, dated Mar. 13, 2020.
(Continued)

*Primary Examiner* — Lincoln D Donovan
*Assistant Examiner* — Alex W Lam
(74) *Attorney, Agent, or Firm* — Workman Nydegger

(57) ABSTRACT

A UPS system includes a plurality of UPSs coupled in parallel and each having a bypass switch and a controller that is in communication with the controller of the other UPSs and including: a first unit monitoring the current flowing through a bypass line of its UPS and determining the effective value of the current strength; a second unit collecting the effective values of all of the UPSs having the bypass switch closed and defining a reference effective value corresponding to the lowest collected effective value; a third unit determining a delay for closing the bypass switch of said UPS, the delay being zero if the effective value of its UPS is equal to the reference effective value; and a fourth unit keeping the bypass switch closed if the delay is zero, or opening it for a duration corresponding to the delay before closing it.

8 Claims, 3 Drawing Sheets

(56) References Cited

U.S. PATENT DOCUMENTS

| | | | | |
|---|---|---|---|---|
| 2016/0111916 A1* | 4/2016 | Prakash | ............... | H02J 9/061 |
| | | | | 307/64 |
| 2017/0163086 A1* | 6/2017 | Bach | ............... | H02J 9/061 |
| 2018/0301930 A1* | 10/2018 | Gonzalez | ............... | H02J 9/061 |

OTHER PUBLICATIONS

International Search Report and Written Opinion from PCT Application No. PCT/FR2020/051246, dated Oct. 2, 2020.

Comments on the Written Opinion of the ISA, dated Jan. 5, 2022.

\* cited by examiner

UNINTERRUPTIBLE POWER SUPPLY SYSTEM WITH DYNAMIC BYPASS-POWER SHARING

TECHNICAL FIELD

The invention relates generally to uninterruptible power supplies (UPS), and more particularly to an automatic bypass system for the shared power supply in an installation including a plurality of uninterruptible power supplies electrically coupled in parallel.

PRIOR ART

The invention can be applied to all uninterruptible power supplies with a static bypass switch controlled independently phase by phase, that is to say with a Silicon Controlled Rectifier (SCR) technology.

An uninterruptible power supply (UPS) is an electrical device capable of supplying power to a load despite variations in the quality and/or availability of energy provided by utilities.

A conventional on-line UPS rectifies the input power provided by an electrical network using a Power Factor Correction Circuit (PFC), in order to power supply a direct current (DC) bus. Rectified direct voltage is typically used to load a battery when the mains is available, as well as to power the DC bus. In the absence of mains power supply, the battery power supplies the DC bus. From the DC bus, an inverter generates an alternating output voltage to the load. Since the DC bus is power supplied from the mains or from the battery, the output power of the inverter remains uninterrupted in the event of a mains failure and the battery is sufficiently loaded. Conventionally known on-line UPSs can also operate in a mode called bypass mode where an unconditioned power supply with basic protection is provided directly to a load by an alternating current (AC) power supply source via a bypass line. The AC power supply source used in bypass mode can be the same as that used for the rectifier or a separate (auxiliary) source.

An uninterruptible power supply system (UPS system) thus has a bypass circuit, or bypass path, which is a power supply path bypassing the UPS, that is to say bypassing the rectifier, the inverter and direct current (DC) power supply such as the battery which form an uninterruptible power supply unit (UPS unit). An automatic bypass circuit can be used by the UPS unit to switch its load to the mains power supply if the UPS system is overloaded or internally failed. A manual, maintenance or service bypass circuit will allow the user to isolate, maintain or remove the UPS unit without interrupting the power supply of the load by switching the load to the mains through the bypass circuit.

Thus, a bypass switch is a non-essential addition to a UPS system which, while not an integral part of the operation of an uninterruptible power supply, is clearly useful in the event of maintenance or repair. If a problem arises or a unit needs to be removed for repair, a bypass switch ensures that power supply continuity is maintained in the event of a failure.

There are two main types of bypass switches that perform similar but distinct functions. These are static bypass switches and external maintenance bypass switches.

The static bypass switch is used as a fail-safe for the inverter. In the event of an inverter failure, the load will automatically drop to the main power input, ensuring continuous power supply. This switch is adapted to almost any on-line UPS system, which is an added safety measure to ensure power supply continuity.

The external maintenance bypass switch, or external maintenance bypass, is connected to the outside of a UPS system and is sometimes referred to as a "wraparound bypass". This bypass is used to continue the power supply flow while the UPS is isolated and easily removed for repair. The alternative is to shut down the entire network in order to remove the UPS, which for some companies can mean several hours of downtime and cost them considerable amounts of money. In addition, in the unlikely event that the UPS system itself should fail, this switch will ensure that the load is transferred safely and allows the unit to be easily removed and replaced.

To improve scalability and/or redundancy, two or more UPSs can be electrically connected to form a single UPS system in parallel with one output. In such a system, the combination of multiple UPSs can increase the power supply capacity of a load connected to the UPS system in parallel. In addition, if one of the UPSs coupled in parallel fails, the other UPSs coupled in parallel can make a backup copy for the failed UPS.

Typically, a parallel UPS system that operates in bypass mode cannot actively control the current flowing through the various bypass paths.

This is because in a parallel UPS system, a successful (that is to say equal) load sharing between the parallel coupled on-line UPSs is achieved in on-line or battery mode by operating the inverter of each on-line UPS in order to properly regulate the power provided to each on-line UPS at the single output (coupled to the load). However, successful load sharing between parallel coupled on-line UPSs is much more difficult to achieve in bypass mode, where unconditioned power supply is provided by each UPS to the single output. More specifically, even though on-line UPSs of the same class are coupled in parallel to a single output and each power supply an output (that is to say the load) in bypass mode, the manufacturing differences of the components of each inverter and differences in the cables coupling each UPS to the single output can result in uneven load distribution between each UPS coupled in parallel.

For example, in the case where two UPSs have their bypass circuits electrically coupled in parallel with each other. If the bypass circuit impedance of each UPS is the same as the other, each UPS will have exactly 50% of the load. However, any mismatch in the bypass circuit impedance will cause different power sharing between the two UPSs.

And, if the load coupled to the installation uses almost 100% of the power that the installation can provide, that is to say almost 100% of the load rate, the impedance mismatch can cause the operation of one UPS overload while the other is not, thus creating a potential malfunction of the entire system.

This is because if a load is unevenly shared between on-line UPSs coupled in parallel and operating in bypass mode, one of the UPSs may be overloaded, which can lead to damage to the components of the UPS. Uneven sharing of a load between on-line UPSs coupled in parallel can also result in the creation of an upstream protection circuit (a circuit breaker, for example) when one of the UPSs is tripped, which causes the latter to transfer the load to the other UPSs coupled in parallel. The additional load transferred to other UPSs can cause an upstream protection circuit to be tripped in another UPS and its load to be transferred to the other UPSs coupled in parallel. As the circuit breaker trip/load transfer process continues to other UPSs, the remaining UPSs may no longer be able to support the load and said load may be dropped.

In general, the power mismatch is directly proportional to the impedance mismatch and indirectly proportional to the impedance. For this reason, and also considering the impedance properties of the cables, high power inverters are more affected by the bypass power supply sharing problem.

A common technique for dealing with uneven load distribution between parallel UPSs operating in bypass mode is to identify the actual part of the load supported by each UPS (that is to say the load distribution part) coupled in parallel and adjust the impedance between each UPS and the load to try to distribute the load evenly across the UPS. The impedance between each UPS and the load can be configured by adjusting the length of the cable connecting each UPS to the load and/or by adding an inductor, that is to say an inductor also called a bypass sharing inductor, between a UPS and the load.

However, such a solution can only alleviate the impedance imbalance and therefore cannot guarantee a high level of bypass-power sharing. Indeed, perfect sharing is very difficult to achieve, normally ±10%, due to the inductive sharing imbalance.

In addition, this hardware solution also has the disadvantage of increasing the total cost, reducing the efficiency, reducing the reliability, increasing the congestion of the installation and increasing the weight.

For example, it is generally accepted that, despite adjusting lengths and/or adding shock absorbers to cables coupling UPSs in parallel to a load, a maximum of four on-line UPSs, or UPS units, operating in bypass mode can be coupled in parallel, since for a coupling of more than four on-line UPSs in parallel will result in a deviation of the load sharing portion of more than 10% between the UPSs. And even with four parallel on-line inverters operating in bypass mode, a deviation of up to 10% of the load sharing portion of each UPS can occur.

A parallel UPS system comprising a plurality of UPS configured to be coupled in parallel is known from document US 2017/163086, each UPS comprising:
  an input configured to be coupled to a power supply source and to receive an input supply power,
  an output coupled to a load and configured to provide an output power to the load derived from at least the input power, and
  a bypass line selectively coupled between the input and the output via a bypass switch, the bypass switch, or static switch, being configured to close in a first operating mode, coupling the UPS input to the UPS output via the bypass line, and to open in a second operating mode, to decouple the UPS input from the UPS output, and
  a common controller configured to measure the value of the current flowing in the bypass line as well as the effective value, or root mean square value, and control the bypass switches of each UPS.

The common system controller described in US 2017/0163086 clearly creates a critical single point of failure which can be fatal to the system, since a controller failure compromises the current sharing of the entire system with possible cascading failure of all bypasses.

In the UPS industry, parallel systems are adopted to take advantage of their redundancy and the presence of a single point of failure of the system described in US 2017/0163086 eliminates this possibility of redundancy, making the parallel system not operational and therefore not desirable.

DISCLOSURE OF THE INVENTION

The invention aims at providing a solution eliminating the concept of increasing the physical impedance in order to eliminate the disadvantages mentioned above, and allowing to achieve a zero error in the stationary state and having a perfect adaptation of the power between the bypass circuit of the various power supplies without interrupting the installation.

In a first object of the invention, provision is made of an uninterruptible power supply system (UPS system) comprising a plurality of uninterruptible power supply (UPS) sources coupled in parallel between a main input configured to be coupled to a power supply source and receive an input power, and a main output configured to be coupled to a load and provide an output power to the load derived from at least the input power, each UPS comprising:
  an input coupled to the main input,
  an output coupled to the main output, and
  a bypass line coupled between the input and the output via a bypass switch configured to be
  closed in a first operating mode, coupling said input to said output via the bypass line, and to be opened in a second operating mode, decoupling said input from said output.

According to a general characteristic of the invention, each UPS of the UPS system comprises a control unit that is in communication with the control unit of all of the other UPSs of the UPS system. The control unit of each UPS comprises:
  a first block comprising a first unit configured to monitor a current signal flowing in the bypass line of its UPS and determine a root mean square value (RMS), that is to say an effective value, of the current strength of said current signal, a second unit configured to collect the RMS values of its UPS and other UPSs of the UPS system for which the bypass switch is closed, and to set an RMS reference value corresponding to the lowest collected RMS value, and a third unit configured to determine an activation delay for closing the bypass switch of its UPS, the activation delay being equal to zero if the RMS value of its UPS is equal to the reference RMS value and the activation delay being different from zero otherwise, and
  a second block comprising a fourth unit configured to control the bypass switch of its UPS according to the activation delay emitted by the third unit, the bypass switch being kept closed if the activation delay is at zero, and the bypass switch being open for a certain time corresponding to the activation delay and then closed otherwise.

At all times, there is always at least one closed bypass switch to ensure a direct path between the main input and the main output of the UPS system.

The UPS system according to the invention thus comprises an electrical structure including a plurality of control units distributed over each of the UPSs of the UPS system. As indicated above, this electrical architecture is produced without a master-slave relationship between the control units of the different UPSs, unlike the system described in the state of the art such as for example in document US 2017/0163086 which still has at least one main controller or one main controller managing the different UPSs or UPS controllers.

The structure of the present invention using the control units distributed on each of the UPSs eliminates the criticality of the single point of failure and therefore creates a current sharing structure adapted for an actual parallel system. With this distributed structure, a failed control unit of a UPS can be excluded with a limited compromise of bypass-power balancing.

This solution eliminates the concept of increasing the physical impedance used in the state of the art and therefore all the disadvantages which are associated with it and which relate to cost, efficiency, reliability, congestion and weight.

Controlling the opening and closing of the bypass switches of the bypass lines of the different UPSs with an activation delay gives the inverter system a solution to provide a continuous output current signal to the load coupled to the UPS system with a balanced sharing of the current flowing in the bypass lines of the different UPSs.

The UPS system according to the invention allows to have a high level of bypass-power sharing, to eliminate the physical inductance, to reduce the overall cost, the total volume and the total weight of the system and to simplify the parallel installation procedure.

The alternating current (AC) power supply source used in the bypass mode may be the same as that used for the rectifier or a separate (auxiliary) source.

In a first aspect of the UPS system, the first block can be configured to operate at a first frequency and the second block can be configured to operate at a second frequency higher than the first frequency, the ratio of the second frequency to the first frequency being proportional to the precision of the requested control.

The system is thus divided into two blocks operating at two different frequencies. A first block operating at low frequency and responsible for managing the logic and the calculation of the delay angle, and a second block operating at a higher frequency allowing to control the bypass switch according to the delay angles.

In a second aspect of the UPS system, the first unit of each control unit may comprise an AC-DC converter to sample the monitored current signal and an RMS calculation module to determine the RMS value of the current sample.

In a third aspect of the UPS system, the second unit of each control unit may comprise a real-time communication module.

In a fourth aspect of the UPS system, the third unit of each control unit may comprise a comparator calculating the difference between the RMS value of the current signal of its UPS and the reference RMS value, and a delay unit configured to calculate said activation delay after which the bypass switch of said UPS can be closed.

In a fifth aspect of the UPS system, the delay unit can include a proportional integral corrector to have zero error at steady state.

In a sixth aspect of the UPS system, the activation delay determined by the third unit may be a delay angle relative to a phase angle, and the third unit may further comprise a saturation module configured to limit the delay angle of the activation delay between a minimum delay angle of 0° and a maximum delay angle depending on the number of UPSs of said UPS system.

The saturation module thus allows to limit the maximum peak value of the current signal which will pass through the UPS once the delay angle is applied.

The maximum delay angle is used to limit the interval in which a single bypass switch is closed to prevent saturation of a current sensor or tripping of a protection.

However, the value of the maximum delay angle may limit the sharing capacity and therefore the possibility of obtaining a zero steady state error, limitation which is necessary to avoid saturation of any current sensor or tripping of any protection.

In a seventh aspect of the UPS system, the second block may further comprise an extraction unit configured to extract fundamental harmonics from the current signal, a phase locked loop (PLL) configured to determine a phase angle of the current signal and detect the zero crossing of the current signal, and a comparator comparing the phase angle of the current signal detected by the PLL at the activation delay determined by the third unit of the first block, the fourth unit of the second block controlling the bypass switch according to this comparison.

To properly apply the delay, the zero crossing of the present signal must be detected. Combining a standard PLL with a fundamental harmonics extraction unit allows such detection with a signal having multiple harmonic components in the current due to loading and shaping.

By continuously comparing the phase angle of the current signal emitted by the PLL at the activation delay, it is possible to detect the starting time of the bypass switch.

BRIEF DESCRIPTION OF THE DRAWINGS

The invention will be better understood from the reading below, in an indicative but non-limiting manner, with reference to the appended drawings.

DESCRIPTION OF THE EMBODIMENTS

Figure 1:
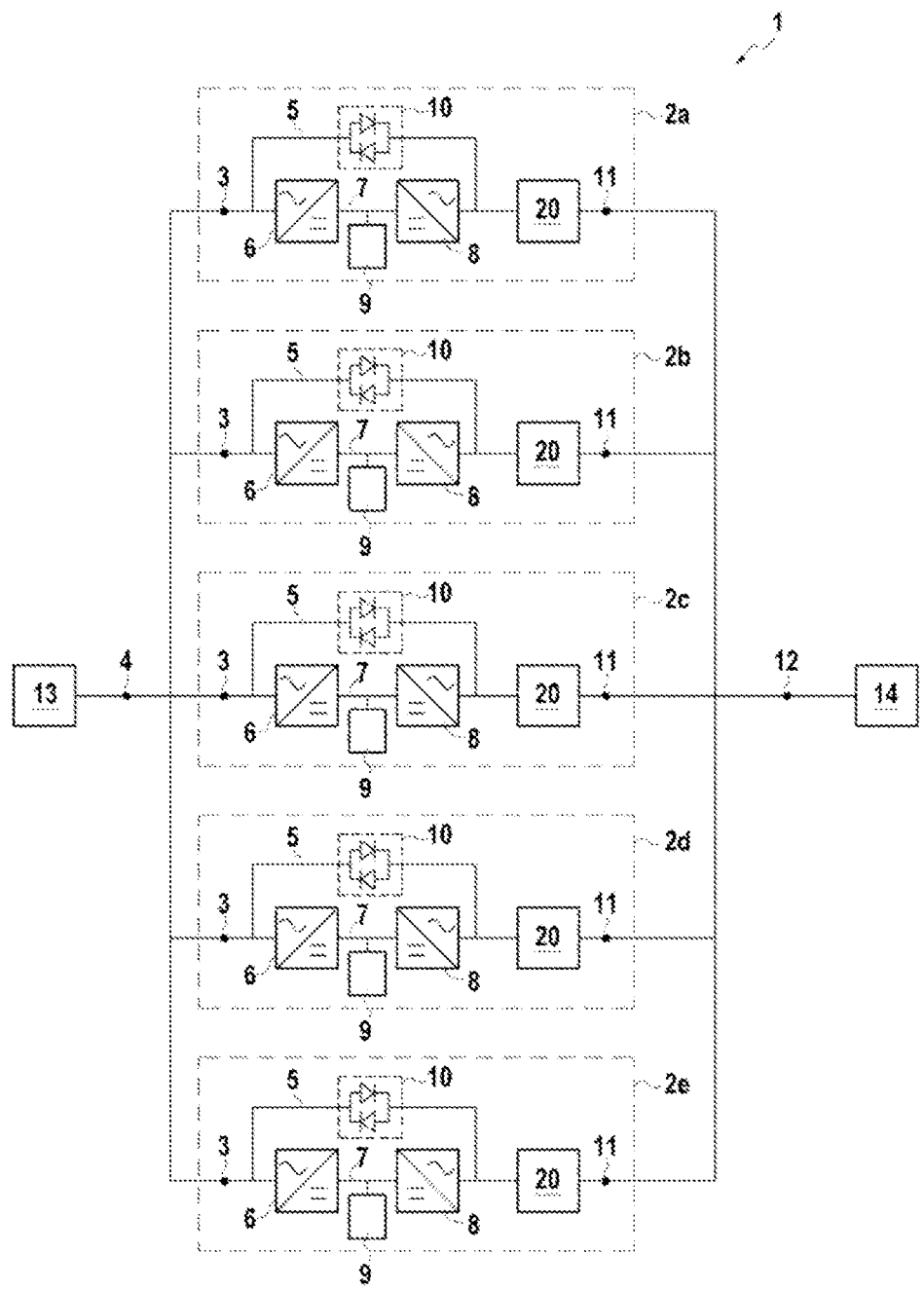
FIG. 1 is a schematic representation of an uninterruptible power supply system according to one embodiment of the invention.

The present invention will be described in connection with particular embodiments and with reference to certain drawings, but the invention is not limited thereto, but only by the claims. The drawings described are only schematic and are not limiting. In the drawings, the size of some of the elements may be exaggerated and not drawn to scale for illustration purposes. When the term "comprising" is used in this description and the claims, it does not exclude other elements or steps. When an undefined or defined article is used to denote a singular name, for example "a", "the", this may include a plural of this name, unless otherwise specified.

The term "comprising" used in the claims should not be interpreted as being limited to the means listed below; it does not exclude other elements or steps. Thus, the scope of the expression "a device comprising the means A and B" should not be limited to devices consisting only of components A and B. This means that, in relation to the present invention, the only relevant components of the device are A and B.

Furthermore, the terms first, second, third and the like in the description and the claims are used to distinguish similar elements and not necessarily to describe a sequential or chronological order. It should be understood that the terms thus used are interchangeable in appropriate circumstances and that the embodiments of the invention described herein are capable of operating in sequences other than those described or illustrated herein.

The present invention relates to a system for equal load sharing between UPSs, that is to say, uninterruptible power supplies, coupled in parallel and operating in bypass mode. The system does not require adjustment of cable lengths or the addition of expensive inductors and is able to provide equal load distribution among more than four UPSs coupled in parallel.

FIG. 1 is a block diagram of a parallel UPS system 1 according to the aspects described here.

The parallel UPS system 1 consists of five UPSs 2a, 2b, 2c, 2d and 2e. Each UPS 2a to 2e comprises an input 3 coupled to a main input 4, a bypass line 5, an AC/DC converter 6, a DC bus 7, a DC/AC inverter 8, a bypass switch 10 and an output 11 coupled to a main output 12.

The main input 4 is coupled to an alternating current power supply source 13 such as a mains power supply. For each UPS 2a to 2e, the input 3 of each UPS 2a to 2e is also coupled to an input of the AC/DC converter 6 and the DC bus 7 is coupled between an output of the AC/DC converter 6 and an input of the DC/AC inverter 8. The inverters 2a to 2e are coupled together in parallel, so that the output 11 of each inverter 2a to 2e is coupled to the load 14 through the main output 12.

In each UPS 2a to 2e, the bypass switch 10 is coupled between the input 3 and the output 11 via the bypass line 5. The bypass switch 10 can comprise two silicon controlled rectifiers, such as a thyristor, or another type of suitable switch, such as a transistor.

As illustrated in FIG. 1, the DC bus 7, is coupled, in this embodiment, to a battery 9 via a DC-DC converter.

Each UPS 2a to 2e further comprises a generic controller, not shown, and a bypass controller 20 both configured to monitor the input power provided to its own UPS 2a to 2e by the input power supply source 13 in different situations, the input power monitoring being achieved by monitoring the input current. Based on the presence and quality of the input power provided to each UPS 2a to 2e by the input power supply source 13, the controller 20 is configured to operate its UPS 2a to 2e in different operating modes.

In response to a determination according to which the alternating current provided by the input power supply source 13 is below or above a desired level (for example, is in a collapsed or swelled condition), the generic controller of each UPS 2a to 2e operates its UPS 2a to 2e to enter an "on-line" operating mode.

In "on-line" operating mode, for each UPS 2a to 2e, the generic controller controls the closing of a recall relay in its UPS 2a to 2e (thus coupling the input power supply source 13 to the input 3 of its UPS) and the opening of the bypass switch 10 of each UPS 2a to 2e. The AC/DC converter 6 of each UPS 2a to 2e receives the alternating current from the input power supply source 13 and is operated by the generic controller to convert the received alternating current into a direct current and provide the direct current to the DC/AC inverter 8 via the DC bus 7. The DC/AC inverter 8 of each UPS 2a to 2e is controlled by the generic controller in order to convert the received direct current into a desired alternating current and provide the desired alternating current to the output 11.

Still in the "on-line" operating mode, a DC-DC converter coupled to the DC bus 7 can be supplied with direct current on the DC bus 7 of each UPS 2a to 2e. The DC-DC converter converts the direct current received from the DC bus into a direct current at a desired load level and the direct current at the desired load level is provided to a corresponding battery 9 to load the battery 9.

In response to a finding of failure of the mains power supply provided by the input power supply source 13 (for example, in the event of a voltage drop or power failure), the generic controller of each inverter 2a to 2e controls switching its UPS to an operating mode called "battery" operating mode.

In "battery" operating mode, the generic controller of each UPS 2a to 2e controls the opening of a recall relay in its UPS (thus decoupling the power supply source 13 from the input 3) and the closing of the bypass switch 10 of its UPS. A direct current from the battery 9 coupled to the DC bus 7 is provided to the DC/AC inverter 8 and the generic controller controls the DC/AC inverter 8 to convert the received direct current into a desired alternating current which is provided to the output 11.

In response to a determination according to which the alternating current provided by the input power supply source 13 is at a desired level, the bypass controller 20 of each UPS 2a to 2e controls its UPS to switch to an operating mode called "bypass" operating mode.

In the "bypass" operating mode, the bypass controller 20 of each UPS 2a to 2e controls the closing of a recall relay (thus coupling the input power supply source 13 to the input 3) and the closing of the bypass switch 10 of its UPS. Thus, in the "bypass" operating mode, the input line 3 of each UPS 2a to 2e (coupled to the input power supply source 13) is coupled directly to the output line 11 of the corresponding UPS 2a to 2e via the bypass line 5. In "bypass" operating mode, the alternating current received on the input line 3 of each UPS 2a to 2e from the input power supply source 13 is provided directly to the output 11.

Figure 2:
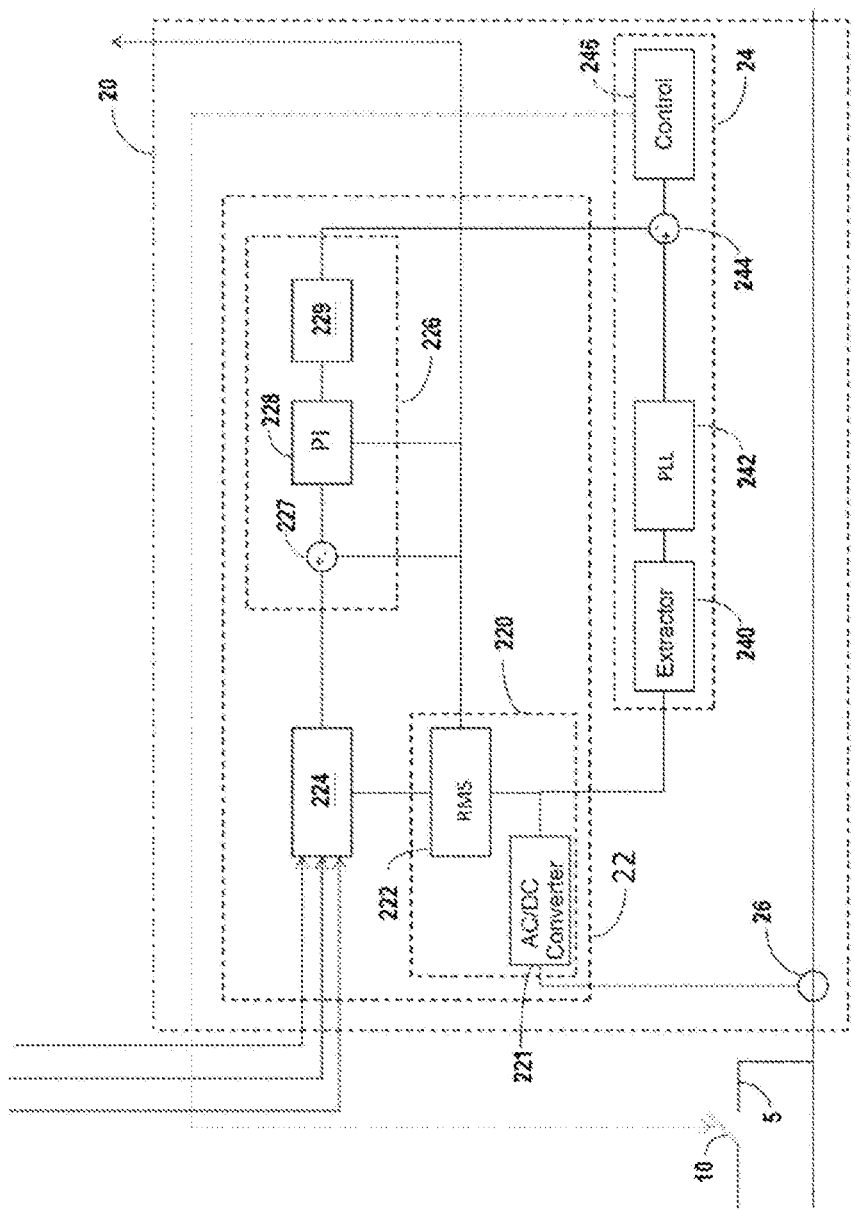
FIG. 2 schematically shows a control unit of one of the uninterruptible power supplies of the power supply system of FIG. 1.

FIG. 2 schematically shows a bypass controller 20 of one of the UPSs 2a to 2e of the UPS system 1 of FIG. 1.

The bypass controller 20 comprises a first block 22, a second block 24, and a current sensor 26 used in determining the current signal flowing in the UPS 2a to 2e.

The first block 22 operates at a first frequency of about 50 Hz and is responsible for managing the logic and the calculation of the delay angle. The second block 24 operates at a second frequency of about 5 kHz and is responsible for controlling the bypass switch based on the delay angles calculated by the first block 22.

The first block 22 comprises a first unit 220, a second unit 224 and a third unit 226. The first unit 220 monitors the current signal flowing in the bypass line 5 of its UPS, and therefore through the UPS in "bypass" mode, and determines an effective value of the current strength. The second unit 224 collects the RMS values of its UPS, for example UPS 2a, and other UPSs, that is to say the UPSs 2b to 2e in this example, from the UPS system 1 for which the bypass switch 10 is closed. The second unit 224 then sets an RMS reference value corresponding to the lowest collected RMS value. The third unit 226 is configured to determine an activation delay for closing the bypass switch 10 of its UPS, 2a in this example.

The first unit 220 of the bypass controller 20 comprises an AC/DC current converter 221 for sampling, through the bypass resistor 26, the monitored current signal. The first unit 220 also comprises an RMS calculation module 222 for determining the RMS value of the current sample delivered by the AC/DC current converter 221.

The second unit 224 of the bypass controller 20 comprises a real-time communication module receiving the RMS value determined by the RMS calculation module 222 of the same first block 22 comprising the second unit 224, that is to say the UPS 2a in this example, as well as the RMS value determined by the RMS calculation module of the first block of the other UPSs, 2b to 2e in this example.

The second unit 224 determines among all the different RMS values of the UPSs with a previous delay angle equal to zero in the previous step, which is the lowest RMS value and sets it as an RMS reference value with an angle of delay set to zero.

The RMS calculation module 222 also transmits the calculated RMS value to the controllers of all other UPSs of the UPS system 1.

The third unit 226 of the bypass controller 20 comprises a comparator 227 receiving the RMS value of the current signal from its UPS determined by the RMS calculation unit 222 of the monitoring unit 220 and the RMS reference value determined by the second unit 224, and a delay module 228 coupled to the output of the comparator 227 and comprising an integral proportional corrector to have a zero steady state error.

The comparator 227 calculates the difference between the effective value of the current signal of its inverter and the reference effective value, then transmits the result to the delay module 228.

If the difference calculated by the comparator 227 is equal to zero, the delay module 228 sets the activation delay to zero, which then corresponds to the order to keep the bypass switch 10 closed.

If the difference calculated by the comparator 227 is other than zero, the delay module 228 calculates an activation delay corresponding to the delay after which the bypass switch 10 of its UPS can be closed, with the bypass switch 10 being controlled to open between the moment the present signal crosses zero and the end of the activation delay.

In this embodiment, the activation delay determined by the delay module 228 of the third unit 226 is a delay angle relative to a phase angle, and the third unit 226 is a saturation module 229 limiting the delay angle of the activation delay emitted by the delay module 228 between a minimum delay angle of 0° and a maximum delay angle according to the number of UPSs of said UPS system 1 in order to limit the maximum peak value of the current signal that will flow through the UPS once the delay angle is applied.

The second block 24 comprises an extraction unit 240 receiving the current sample delivered by the AC/DC current converter 221 of the first unit 220 of the first block 22, and a phase locked loop (PLL) unit 242 coupled to the output of the extraction unit.

The extraction unit 240 extracts the fundamental harmonics from the current signal and transmits them to the PLL unit 242 which determines a phase angle of the current signal and detects the zero crossing of the current signal.

The second block 24 further comprises a comparator 244 and a control unit 246.

The comparator 244 receives the delay angle determined by the third unit 226 of the first block 22 together with the phase angle of the current signal determined by the PLL 242 of the second block 24. The comparator 244 compares the phase angle of the current signal detected by the PLL 242 at the activation delay determined by the third unit 226 and sends the result to the control unit 246 of the second block 24.

The control unit 246 controls the UPS bypass switch 10 based on this comparison. The bypass switch 10 is kept closed if the activation delay is zero and is open from the moment the UPS current signal crosses zero until the end of a period corresponding to the activation delay when the bypass switch 10 is closed again.

Thus, at all times, there is always at least one bypass switch which is closed in order to ensure a direct path between the main input and the main output of the UPS system.

Switching UPSs to the "bypass" mode is described in more detail below in relation to FIGS. 2 and 3.

Figure 3:
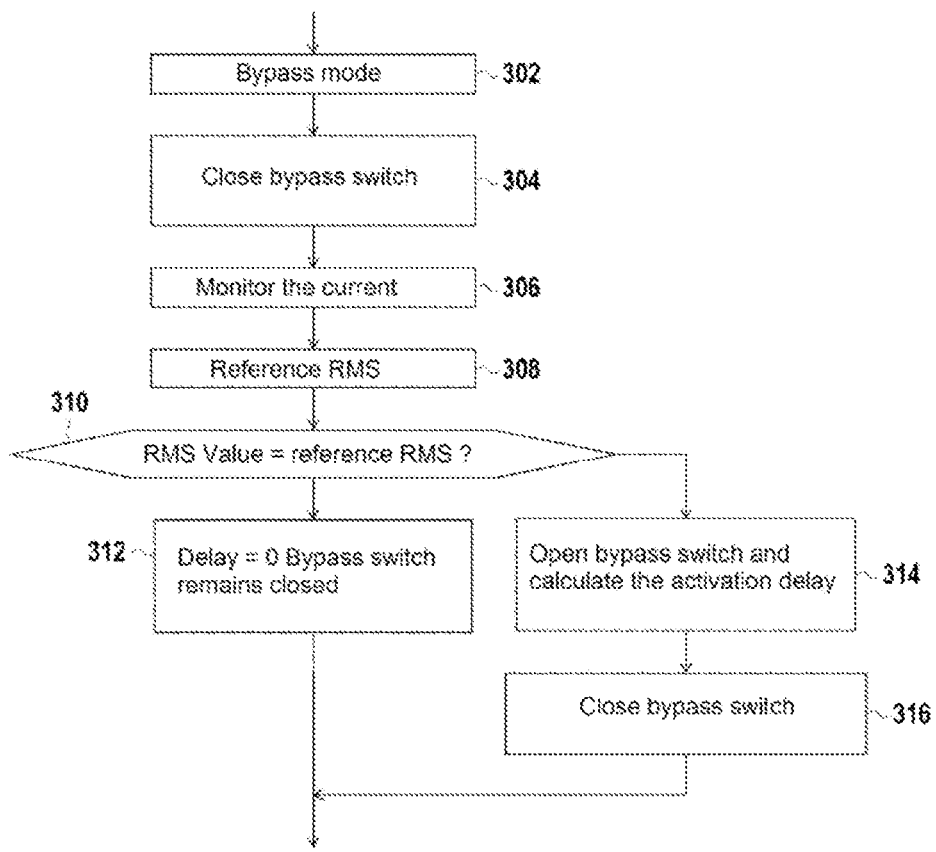
FIG. 3 shows a flowchart of an operating method of the parallel UPS system 1 in "bypass" mode according to one embodiment.

FIG. 3 is a flowchart of the process illustrating an embodiment of the operation of the parallel UPS system 1 in "bypass" mode.

In step 302, the bypass controller 20 indicates that the UPS to which the bypass controller 20 belongs should operate in the "bypass" operating mode.

In step 304, in response to determining the operating control of its UPS in the "bypass" operating mode, the bypass controller 20 controls the closing of the bypass switch 10 of its UPS, thereby coupling the input 3 of its UPS to its output 10. After closing the bypass switch 10 of each UPS, each UPS 2a to 2e provides unconditioned output power (provided directly from the input 3) to the load 14 via its bypass line 5. More specifically, once the bypass switch 10 of each UPS 2a to 2e is closed, each UPS 2a to 2e provides an output current having a current waveform to the load 14.

In step 306, the first unit 220 of the first block 22 of the bypass controller 20 of each UPS 2a to 2e monitors the output current of its UPS.

Then, in step 308, the second unit 224 of the first block 22 of each bypass controller 20 determines the lowest output current of all UPSs 2a to 2e (that is to say the lowest value of the root mean square (RMS) value) and defines it as the RMS reference value.

In step 310, the comparator 227 of the third unit 226 of the first block 22 of each bypass controller 20 compares its RMS value to the RMS reference value.

If the RMS value of its UPS is equal to the RMS reference value, in step 312, the second unit 226 of the first block 22 of the UPS bypass controller 20 sets the activation delay to zero and keeps the bypass switch 10 of its UPS closed even at zero crossing of the output current waveform. In such a case, the current flowing through the bypass switch 10 of the UPS is a full sine waveform and the load 14 coupled to the output 11 of the UPS continuously receives the full sine waveform of this UPS.

If the RMS value of its inverter is greater than the RMS reference value, in step 314, the bypass controller 20 of the inverter opens the bypass switch 10 of its inverter and performs a regulation process for the second unit 226 of the first block 22 of its controller to determine an activation delay after which the bypass switch 10 will be closed.

In step 316, the bypass controller 20 of a UPS whose bypass switch is open finally closes the bypass switch 10 at the end of the activation delay.

For example, according to at least one embodiment, the bypass controller 20 of an inverter with an effective value greater than the RMS reference value controls the opening of the bypass switch 10 of its UPS during a delay period when its output current waveform crosses zero.

In other words, the bypass controller 20 of each UPS having an RMS value greater than the RMS reference value (that is to say, the UPSs which do not have the lowest output current) operates the bypass switch 10 of its UPS so that it opens for a delay the zero crossing of the output current waveform of the UPS. When a bypass switch 10 is opened at zero crossing, the current cannot flow through the bypass switch 10. After the delay period, the bypass controller 20 closes the bypass switch 10, the current flows through the bypass switch 10 and the output current waveform is provided to the load 14 from the corresponding inverter.

At zero crossing of the output current of each UPS, at least one UPS (the one with the lowest RMS value) supplies the load 14. The load 14 is gradually transferred from one UPS to another (that is to say, after the corresponding delay after the zero crossing of the output current waveform of each other inverter). Thus, the load 14 is progressively shared between the different UPSs. Each bypass controller 20 controls this "switching" of the bypass line 5 of its UPS in parallel with the bypass line 5 of the UPS which has remained closed (after each zero crossing) so that the energy provided to the load 14 is shared equally between UPSs 2a to 2e.

More specifically, each bypass controller 20 configures the activation delay of its UPS 2a to 2e such that the root mean square (RMS) of its UPS output current is substantially the same as the RMS reference value. By actively adjusting the activation delay of each UPS having an RMS value different from the RMS reference value, the root mean square (RMS) of the output current of each UPS 2a to 2e can be configured in much the same way, despite the potential differences in components and wiring in each UPS 2a to 2e. When the effective value of the output current of each UPS 2a to 2e (that is to say the load sharing part of each UPS) is substantially the same, the difference between the load sharing parts of each UPS 2a to 2e is relatively small (for example about 0.1%) and eight or more UPSs can be successfully coupled in parallel (that is to say with equal load sharing).

By providing a full output current waveform to the load 14 through the UPSs having the lowest RMS value and actively introducing a delay period into the output current waveform of each UPS to control the effective value of the output current of each UPS 2a to 2e to be substantially the same, an equal distribution of the load between the different UPSs 2a to 2e is provided and overloading of the UPSs 2a to 2e can be prevented. In addition, the power flow through the UPSs having an RMS value greater than the RMS reference value can be reduced because each of these UPSs provides less than a full cycle of an output current waveform to the load 14. The reduced power flow through these UPSs can result in a reduction in the amount of heat generated in each of these UPSs and the impact on the circuit breakers in each of these UPSs could also be reduced.

According to one embodiment, the bypass controller 20 is configured to analyze and update the load sharing between the different UPSs 2a to 2e each time the UPS system 1 switches to "bypass" mode.

As described above, the system and method allowing equal load sharing are used with a parallel UPS system, including on-line UPSs. However, in other embodiments, the system and method described herein can be used with other types of UPS or power supply systems, coupled in parallel, in order to provide an equal distribution of the load with unregulated power outputs.

As discussed above, a system for providing equal load sharing between UPSs coupled in parallel and operating in bypass mode is provided herein. The system does not require adjusting the length of cables or adding expensive inductors and can include more than four UPSs coupled in parallel. By providing a full output current waveform to a load through UPSs operating continuously in a bypass mode and actively introducing a delay period into the output current waveform of each of the other UPSs coupled in parallel in order to have relatively equal RMS output current values of each UPS, equal load sharing between UPSs can be ensured despite potential differences in the components and wiring of each inverter. Since the output current of each inverter (that is to say the load sharing portion of each inverter) is substantially the same, the difference between the load sharing portions of each UPS is relatively small (for example, approximately 0.1%) and more than four UPSs can be successfully coupled in parallel while reducing many of the risks associated with load sharing between UPSs, operating in bypass mode, coupled in parallel.

Having thus described several aspects of at least one embodiment of the present invention, it should be understood that various modifications, modifications and improvements will be readily apparent to the person skilled in the art. Such alternatives, modifications and improvements are intended to form part of the present description and are intended to be within the spirit and scope of the invention. Accordingly, the above description and the drawings are given by way of example only.

The invention claimed is:

1. An uninterruptible power supply system (UPS system) comprising a plurality of uninterruptible power supply (UPS) sources coupled in parallel between a main input configured to be coupled to a power supply source and receive an input power, and a main output configured to be coupled to a load and provide output power to the load derived from at least the input power, each UPS comprising:
   an input coupled to the main input,
   an output coupled to the main output, and
   a bypass line coupled between the input and the output via a bypass switch configured to be closed in a first operating mode, coupling said input to said output via the bypass line, and to be opened in a second operating mode, decoupling said input from said output,
   wherein, each UPS of the UPS system comprises a control unit, each of said control units being in communication with all of the other control units of the UPS system, the control unit of each UPS comprising:
   a first block comprising a first unit configured to monitor a current signal flowing in the bypass line of its UPS and determine a root mean square value (RMS), that is to say an effective value, of the current strength of said current signal, a second unit configured to collect the RMS values of its UPS and other UPSs of the UPS system for which the bypass switch is closed, and to set an RMS reference value corresponding to the lowest collected RMS value, and a third unit configured to determine an activation delay for closing the bypass switch of its UPS, the activation delay being equal to zero if the RMS value of its UPS is equal to the reference RMS value and the activation delay being different from zero otherwise, and
   a second block comprising a fourth unit configured to control the bypass switch of its UPS according to the activation delay emitted by the third unit, the bypass switch being kept closed if the activation delay is at zero, otherwise the bypass switch being open for a certain time corresponding to the activation delay and then closed.

2. The UPS system according to claim 1, wherein the first block can be configured to operate at a first frequency and the second block can be configured to operate at a second frequency higher than the first frequency, the ratio of the second frequency to the first frequency being proportional to the precision of the requested control.

3. The UPS system according to claim 1, wherein the first unit of each control unit comprises an AC-DC converter to sample the monitored current signal and an RMS calculation module to determine the RMS value of the current sample.

4. The UPS system according to claim 1, wherein the second unit of each control unit comprises a real-time communication module.

5. The UPS system according to claim 1, wherein the third unit of each control unit comprises a comparator calculating the difference between the RMS value of the current signal of its UPS and the reference RMS value, and a delay unit configured to calculate said activation delay after which the bypass switch of said UPS can be closed.

6. The UPS system according to claim 1, wherein the delay unit comprises a proportional integral corrector to have zero error at steady state.

7. The UPS system according to claim 1, wherein the activation delay determined by the third unit is a delay angle relative to a phase angle, and the third unit further comprises a saturation module configured to limit the delay angle of the activation delay between a minimum delay angle of 0° and a maximum delay angle depending on the number of UPSs of said UPS system.

8. The UPS system according to claim 1, wherein the second block further comprises an extraction unit configured to extract fundamental harmonics from the current signal, a phase locked loop (PLL) configured to determine a phase angle of the current signal and detect the zero crossing of the current signal, and a comparator comparing the phase angle of the current signal detected by the PLL at the activation delay determined by the third unit of the first block, the fourth unit of the second block controlling the bypass switch according to this comparison.

* * * * *